INVENTOR.
John T. Egbert
BY Wayne Lang
AGENT

United States Patent Office 3,144,902
Patented Aug. 18, 1964

3,144,902
HEAT EXCHANGER ARRANGEMENT
John T. Egbert, Wellsville, N.Y., assignor, by mesne assignments, to Combustion Engineering, Inc., a stock corporation of Delaware
Filed June 9, 1961, Ser. No. 115,981
8 Claims. (Cl. 165—7)

The present invention relates to heat exchangers of the rotary regenerative type, and particularly it relates to a ceramic heat absorbent element that permits the efficient use of a vertical flow heat exchanger in applications where the use of a horizontal type heat exchanger would normally be required to permit optimum ducting arrangements.

In certain high temperature processes the use of metallic heat exchange apparatus is substantially precluded by temperature limitations of the material involved. Thus if heat is to be salvaged from such a process to raise its overall efficiency, heat exchangers of temperature resistant ceramic materials or their equivalent are required. In many applications a horizontal type heat exchanger arranged to permit the horizontal flow of fluid through the heat exchanger would be more practical than the usual vertical type heat exchanger, but inasmuch as ceramic materials do not have the physical properties necessary for this type of structure, the development of a horizontal type ceramic heat exchanger has been considered impractical and applications adapted only to horizontal flow have substantially precluded the use of such apparatus.

This invention is therefore directed to an arrangement for a rotary regenerative heat exchanger that permits the use of a vertical heat exchanger in a wide variety of applications including those having ductwork generally adapted for use only with a rotary heat exchanger of the horizontal type.

Figure 1:
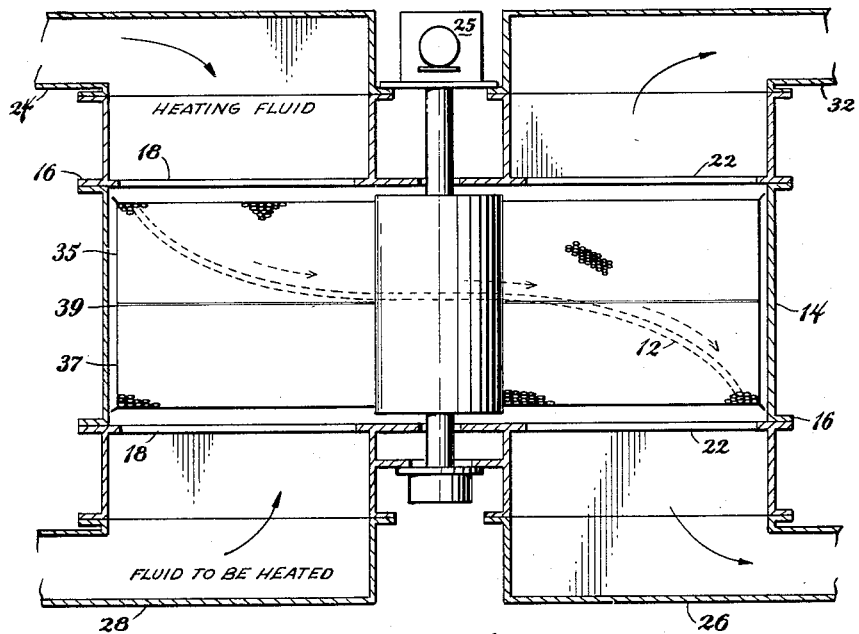
Figure 2:
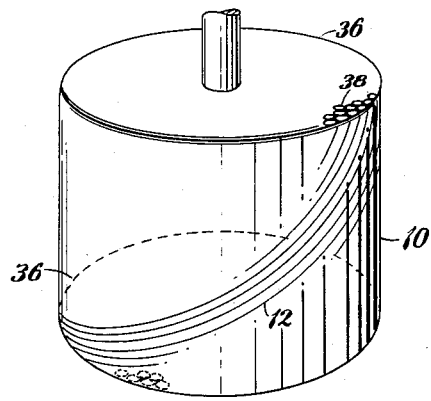

The invention will be best understood upon consideration of the following detailed description thereof when read in conjunction with the accompanying drawings in which:

FIGURE 1 is a longitudinal section of a rotary regenerative heat exchanger having a rotor arranged according to this invention, and FIGURE 2 is a perspective view of a rotor element that involves the invention.

In the drawing the numeral 10 designates a ceramic rotor formed with a multiplicity of passageways 12 that extend between its axially spaced ends. The rotor is enclosed in a housing 14 which is provided at either end with end or sector plates 16 which include apertures 18 and 22 between imperforate portions. The rotor first absorbs heat from the heating fluid entering the heat exchanger through a duct 24 from a suitable source of heat and is discharged, after passing through the passageways 12 in alignment therewith, through an outlet duct 26. As the rotor is turned slowly about its axis by a motor and reduction gearing arrangement 25, the heated portion of the rotor is moved progressively into a stream of the fluid to be heated which is admitted through duct 28. After passing over the hot heat absorbent material and absorbing heat therefrom, the then heated fluid is directed to a suitable place of use through a duct 32.

In accordance with the invention the cylindrical heat absorbent rotor is formed with a multiplicity of separate fluid passageways 12 that extend between end faces 36 of the rotor to provide in effect an irregular but imperforate series of walls or partitions 38 lying between adjacent flow passageways. The partitions 38 cooperate with the imperforate portion of the end plate that lies between apertures to preclude fluid flow therebetween. The flow passageways 12 are inclined in a plane lying normal to the radius of the rotor to circumferentially displace the outlet openings of said passageways a distance at least as great as the circumferential extent of the imperforate portion of each end plate. In this manner gases entering one side of the rotor, as through duct 24, are exhausted through duct 26 and gases from inlet duct 28 are exhausted through duct 28. By diametrically displacing outlet openings from their respective inlet openings at the opposite end of the rotor, gases entering one side of the rotor may be rotated 180° before being exhausted through the outlet duct.

This arrangement is highly advantageous from a ducting standpoint but it also provides a substantial increase in heat absorbing capacity for the rotor by virtue of the increased length of flow passageways 12 as compared with those of the usual rotary regenerative heat exchanger that has axial or nearly axial flow passageways therethrough.

This arrangement is diagrammatically illustrated in FIGURE 1 where after traversing the flow passageways through the rotor the gas (heating fluid) and air (fluid to be heated) may be directed in a uniformly horizontal direction with an optimum arrangement of connecting ductwork.

In forming a rotor of this type, it may be comprised of a single section or a plurality of vertically abutting sections that have similar end faces and a series of inclined passageways extending therethrough. In such an arrangement the total circumferential displacement of the fluid passageways will be equal to the number of abutting sections multiplied by the angular displacement of the passageways therethrough. Thus, if the openings at one end of each section were circumferentially displaced 60° from their respective openings at the opposite end, a series of three abutting sections in axial alignment would displace the end openings a total of 180°, or from one side to a diametrically opposite location. Two sections 35 and 37 with the end openings of the passages each displaced 90° will provide a 180° displacement of end openings in the manner shown in FIGURE 1.

To preclude leakage between abutting sections a plastic ceramic mastic or its equivalent may be spread on the abutting section ends 39 to bond the several sections into a virtually monolithic mass.

Although forming the rotor in sections as above defined may offer certain manufacturing advantages, the rotor may be comprised of a single casting or extrusion that is formed to include the inclined passageways therethrough. If formed by extruding, the plastic extrusion is twisted about its axis to displace one end face from the other as shown in FIGURE 2. After extrusion, the formed mass may be fired and the ends thereof may be ground into parallel planes to provide suitable sealing surfaces for the ends of the rotor. When extruded in this manner the openings through the ceramic mass may be formed to include any of a variety of extended surface configurations adapted to increase the surface area of the fluid passageways 12.

While this invention has been described with reference to the embodiment illustrated in the drawing, it is evident that various changes may be made without departing from the spirit of the invention, and it is intended that all matter contained in the above description or shown in the accompanying drawings shall be interpreted as illustrative and not in a limiting sense.

I claim:

1. Regenerative heat exchange apparatus having a cylindrical matrix arranged to direct a heating fluid and a fluid to be heated alternately through spaced parts of the matrix, said matrix comprising a heat absorbent mass formed with a multiplicity of passageways that extend between inlet and outlet openings in spaced ends of the matrix, said passageways extending continuously and inclined similarly in a plane normal to the radius of said matrix to circumferentially displace the outlet openings from the inlet openings of said passageways.

2. A rotary regenerative heat exchanger having a rotor pivotally mounted to rotate about its axis to direct a heating fluid and a fluid to be heated alternately through spaced parts of the rotor, said rotor comprising a cylindrical heat absorbent mass formed with a multiplicity of axial passageways that extend continuously between inlet and outlet openings in spaced ends of the rotor, said passageways being inclined similarly in a plane normal to the radius of said rotor to circumferentially displace the outlet openings diametrically from said inlet openings.

3. A rotary regenerative heat exchanger having a cylindrical rotor pivotally mounted to rotate about its axis and direct a heating fluid and a fluid to be heated alternately through spaced parts of the rotor, said rotor comprising a plurality of axially abutting cylindrical sections of ceramic material formed with a multiplicity of passageways extending axially therethrough and having the passageways of abutting sections in alignment to direct a stream of fluid continuously therethrough.

4. A rotary regenerative heat exchanger having a cylindrical rotor pivotally mounted to rotate about its axis and direct a heating fluid and a fluid to be heated alternately through spaced ports of the rotor, said rotor comprising a plurality of axially abutting ceramic cylinders having a multiplicity of separate passageways extending between inlet and outlet openings in spaced ends thereof, said passageways being in continuous alignment and inclined in a plane normal to the radius of said rotor to circumferentially displace openings at opposite ends of said passageways.

5. Rotary regenerative heat exchange apparatus as defined in claim 2 wherein inlet and outlet openings at opposite ends of continuous aligned passageways are displaced circumferentially a like amount.

6. Rotary regenerative heat exchange apparatus as defined in claim 2 wherein inlet and outlet openings at opposite ends of continuous aligned passageways are displaced circumferentially in the order of 180°.

7. Rotary regenerative heat exchange apparatus as defined in claim 4 wherein axially abutting ceramic cylinders are integrally bonded together by sealing means that precludes leakage of fluid therebetween.

8. A rotary regenerative heat exchanger having a rotor, a housing surrounding the rotor provided opposite the latter with end plates including imperforate portions between spaced apertures, inlet and outlet ducts connected to said apertured end plates at opposite ends of the rotor to direct a heating fluid and a fluid to be heated to and through the rotor, said rotor comprising a cylindrical heat absorbent mass formed with a multiplicity of passageways that extend between openings in axially spaced ends of said mass, said passageways inclined similarly in a plane normal to the radius of said matrix to circumferentially displace openings at axially spaced ends of said passageways to lie simultaneously at opposite sides of the imperforate portion of the spaced end plates.

References Cited in the file of this patent

UNITED STATES PATENTS

| | | |
|---|---|---|
| 1,409,520 | Bird | Mar. 14, 1922 |
| 2,915,297 | Lange | Dec. 1, 1959 |
| 2,983,486 | Rosenberg | May 9, 1961 |

FOREIGN PATENTS

| | | |
|---|---|---|
| 933,810 | Germany | Oct. 6, 1955 |